United States Patent [19]
Curran et al.

[11] Patent Number: 5,428,762
[45] Date of Patent: Jun. 27, 1995

[54] EXPANDABLE MEMORY HAVING PLURAL MEMORY CARDS FOR DISTRIBUTIVELY STORING SYSTEM DATA

[75] Inventors: Brian W. Curran, Saugerties; Joseph L. Temple, III, Hurley, both of N.Y.

[73] Assignee: International Business Machines Corporation, Armonk, N.Y.

[21] Appl. No.: 850,194

[22] Filed: Mar. 11, 1992

[51] Int. Cl.$^6$ ............... G06F 13/40; G06F 13/38; G06F 13/42
[52] U.S. Cl. .................. 395/425; 361/737; 361/736; 361/633; 395/400; 395/325
[58] Field of Search .......... 395/425, 400, 325; 365/63, 52; 361/633, 736, 737, 761

[56] References Cited

U.S. PATENT DOCUMENTS

| | | | |
|---|---|---|---|
| 3,753,235 | 8/1973 | Daughton et al. | 365/200 |
| 4,777,355 | 10/1988 | Takahira | 235/380 |
| 4,799,144 | 1/1989 | Parruck et al. | 395/800 |
| 4,888,773 | 12/1989 | Arlington et al. | 371/40.2 |
| 4,905,182 | 2/1990 | Fitch et al. | 395/275 |
| 4,931,923 | 6/1990 | Fitch et al. | 395/500 |
| 4,951,248 | 8/1990 | Lynch | 395/425 |
| 4,984,193 | 1/1991 | Nakagawa | 395/425 |
| 4,999,805 | 3/1991 | Culley et al. | 395/325 |
| 5,218,684 | 6/1993 | Hayes et al. | 395/400 |
| 5,241,643 | 8/1993 | Durkin et al. | 395/425 |
| 5,261,068 | 11/1993 | Gaskins et al. | 395/425 |

OTHER PUBLICATIONS

*Microsoft Press Computer Dictionary*, 2nd Ed.; Microsoft Press 1994: p. 218–219.
*Dictionary of Computers, Information Processing, and Telecommunications* 2nd Ed.; Jerry M. Rosenberg; 1987; pp. 305.
Dietsch et al., "High Density Memory Package", IBM TDB vol. 33, No. 3A, Aug. 1990, pp. 96–98.
IBM TDB vol. 31, No. 1, Jun. 1988, "Automatic Configuration of Memory Options with Fault Bypassing", pp. 299–300.

Primary Examiner—Glenn Gossage
Assistant Examiner—Reginald Bragdon
Attorney, Agent, or Firm—Floyd A. Gonzalez; Jeremiah G. Murray

[57] ABSTRACT

An improved memory system and memory controller which permits simplified memory upgrades in the field. The system includes a memory board with multiple card sockets. As additional cards are added the data cables are distributed among the cards and the memory controller is programmed to coordinate the sequencing of the memory in the cards. Data is transferred between the cards and memory controller via distributively coupled cables. Control and address signals are provided to cards via wires embedded in the memory board from the memory controller. A repowering circuit on each card makes copies of the control and address signals which are sent to other cards through the embedded wires in the board. Data received by a card is stored in memory through steering logic and buffers.

7 Claims, 6 Drawing Sheets

EXPANDABLE MEMORY HAVING PLURAL MEMORY CARDS FOR DISTRIBUTIVELY STORING SYSTEM DATA

BACKGROUND OF THE INVENTION

1. Field of the Invention

This invention relates to computer memory subsystems and in particular to expandable memory subsystems which permit different size systems or offerings.

2. Description of Related Art

Prior art memory subsystems are implemented with one or more boards populated with memory array cards. In general, they provide different memory size (mega-byte) offerings. Three primary memory upgrade strategies have been used in prior-art systems. A "memory upgrade" increases the number of mega-bytes of memory in a customer's machine. The three memory upgrade strategies are different card sizes, flexible bus structure and multidrop design.

In the different card size approach, a fixed number of cards comprises each memory bank. A "memory bank" is an independently addressable set of memory cards which act in accordance during memory fetches and stores. Depopulated cards are used to construct the smaller memory offerings. A "depopulated card" is a memory card containing ½, ¼, etc. of the allowable DRAM (Dynamic Random Access Memory) chips. This approach of using depopulated cards has some disadvantages of increased memory card part numbers, handling of card returns, and scrapping of depopulated memory cards or reworking of depopulated cards to increase the number of DRAMs on the card.

In a flexible bus structure a variable number of cards comprise each memory bank. The system to memory data bus width increases as more cards are plugged. The disadvantages include: reduced memory subsystem bandwidth and performance for the smaller memory offerings. Also the configurable memory data bus is difficult to implement on the system side.

In the multidrop design approach a variable number of cards comprises each memory bank. Each bit of the system to memory data bus is wired to each memory card. This approach is used in personal computers and most workstations. In high-performance systems that have high system clock rates this strategy severely limits the memory bandwidth. The increased memory data bus loading capacitance and the increased signal reflections on the data bus nets restrict the maximum rate at which data can be transferred between the system and memory cards. A "multidrop net" is a net which is wired to two or more receivers.

SUMMARY OF THE INVENTION

The system comprises a circuit board with multiple card sockets. The system comprises one or more memory cards with first card connector(s) for said card sockets and second card connector(s) for data transfers between system and memory card(s) and a memory controller via cables. Control signals required to coordinate the sequencing of the memory are provided by accessing means on the card or a central source via the wires embedded within the circuit board.

These and other improvements are set forth in the following detailed description. For a better understanding of the inventions with advantages and features, reference may be had to the description and to the drawings.

DETAILED DESCRIPTION OF THE INVENTION

Before considering our preferred embodiments in detail, it may be worthwhile to illustrate, by way of example, the operation of the smallest memory offering and an intermediate memory offering.

Figure 1:
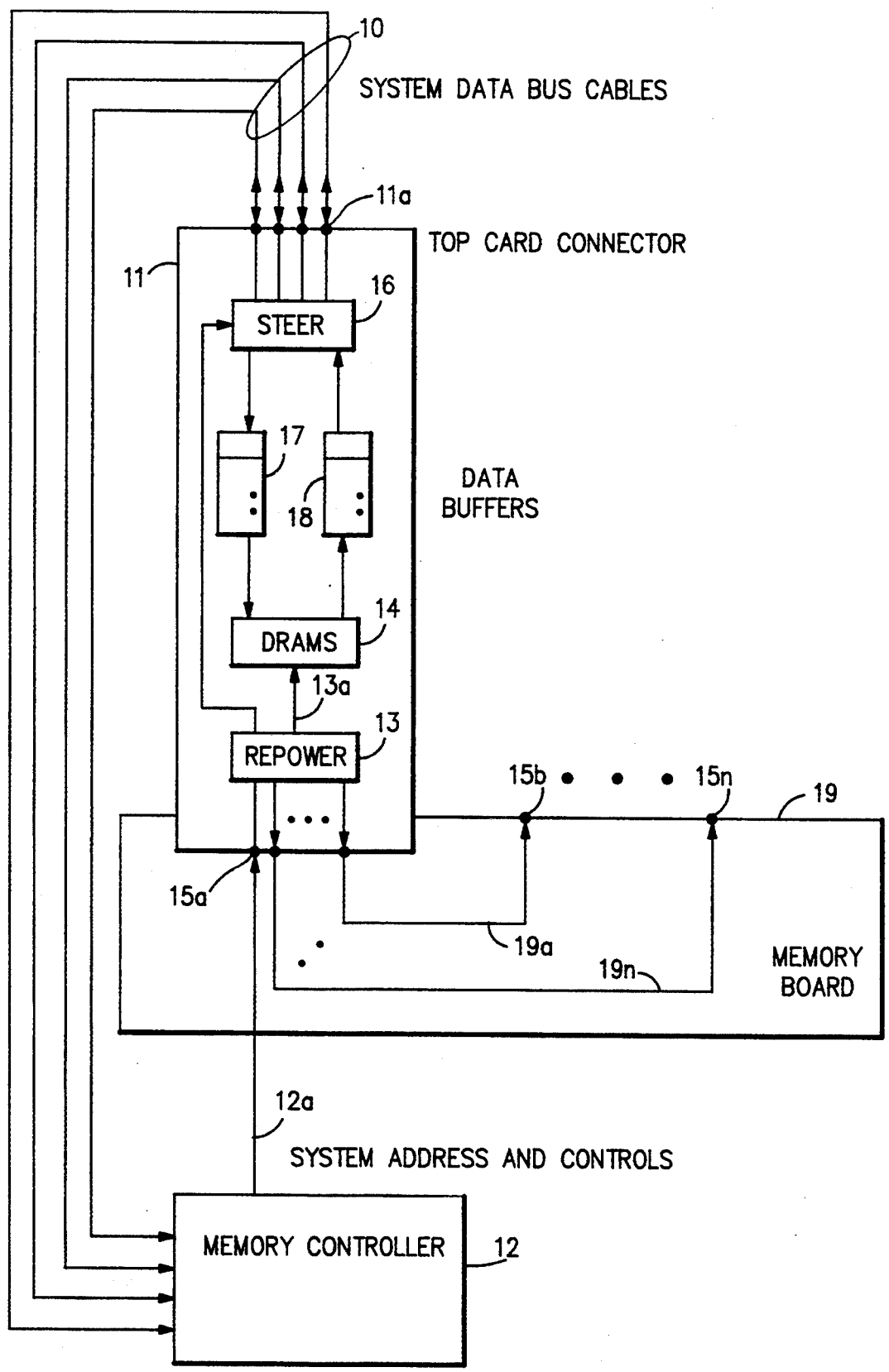
FIG. 1 shows schematically a minimum-memory offering of one card such that it receives/supplies an entire word of data from/to the system.

In a typical smallest memory system or offering of the present invention, sixteen words of data are transferred to a single memory card in sixteen consecutive cycles (See FIG. 1). These words are stored into a 16-deep store line buffer residing in the memory support circuitry. Upon filling of the store buffer the memory controller initiates a four-page cycle DRAM write operation. Four words of data from the store buffer are written into the DRAM array for each of the four page cycles. For a fetch operation the memory controller initiates a four-page cycle DRAM read operation. As the DRAM data is filling the on-card fetch line buffer the memory controller initiates the sixteen word fetch transfers.

During a memory upgrade an additional memory array card is plugged into the memory board. Half of the data cables wired to the initial memory card are plugged into the top card connector of the new card and the memory controller is reprogrammed to provide two-page cycle DRAM timings.

Figure 2:
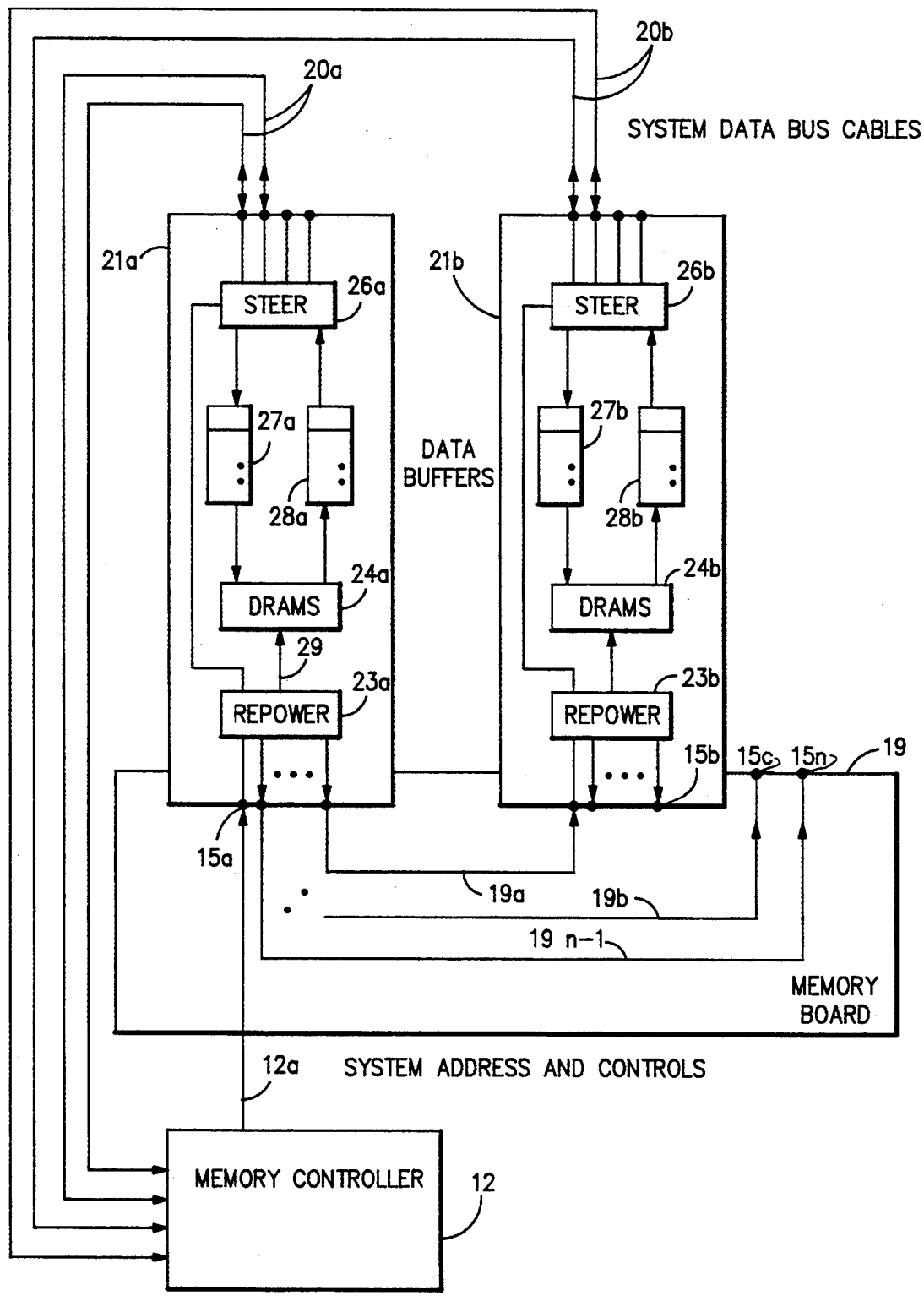
FIG. 2 shows an intermediate memory offering of two cards such that each receives/supplies a half-word of data from/to the system.

In this intermediate memory offering sixteen words of data are transferred to the memory cards in sixteen consecutive cycles: each card receiving half of the word (See FIG. 2). These half-words are stored into half of the 16-deep store line buffer residing in the memory support circuitry of each card. Upon half-filling of the store buffers the memory controller initiates a two-page cycle DRAM write operation. Eight words of data (four words from each card) in the store buffer are written into the DRAM array for each of the two page cycles. For a fetch operation the memory controller initiates a two-page cycle DRAM read operation. As the DRAM data is being loaded into the on-card fetch line buffer the memory controller initiates the sixteen word fetch transfers.

Turning now to our inventions in greater detail, it will be seen from FIG. 1 our preferred minimum offering embodiment in which four data cables 10 are plugged into the top card connector 11a of a single memory array card 11. The four data cables 10 are distributively coupled between the top card connector 11a of single memory array card 11 and the memory controller 12. The memory card 11 is plugged into a socket 15a of memory circuit board 19. The system address and other controls required to sequence the DRAM operations are driven by the memory controller 12 to this card via cables 12a to connector socket 15a. The card contains repower logic 13 which powers the address and controls to the DRAM array 14 and to the other card slots or sockets 15a–15n, through wiring 19a–19n embedded in the memory circuit board 19. The repower logic 13 merely duplicates the address information and provides it along one or more wires 19a–19n to the other card sockets 15b–15n. Data to be stored into the DRAM array 14 is first transferred from memory controller 12 across the four data cables 10 through the steering logic 16 and into the store buffer 17. Then the memory controller 12 sends the address and other control information to the DRAM array 14 via cables 12a. The on-card repowering and control circuitry 13 gates the data from the store buffer 17 to the DRAM array 14 and sequences the DRAMs such that the data is stored into the DRAM array 14. For a fetch operation the memory controller 12 sends address and other control information to access data from the DRAM array 14 and to latch this data in the fetch buffer 18. Then the memory controller 12 initiates the transfer of data from the fetch buffer 18 back to itself via cables 10 and the steering logic 16. The steering logic 16 receives the control signals for reading and storing in the buffers, the double word ID and load and empty signals. The address, read/write, CAS (Column Address Strobe), RAS (Row Address Strobe) valid are provided to the DRAM arrays 14 via repower logic 13 and wires 13a. The refresh is provided by the memory array card 11 with synchronization from the memory controller 12.

FIG. 2 illustrates our preferred intermediate embodiment in which two data cables 20a are plugged into the top card connector of a first memory array card 21a and two other data cables 20b are plugged into the top card connector of a second memory array card 21b. The data cables 20a and 20b are distributively coupled between the top card connectors of the first and second memory array card (21a and 21b) and the memory controller 12. The system address and other controls required to sequence the DRAM operations are driven by the memory controller 12 to the first memory card 21a via cables 12a to connector socket 15a. This card 21a contains repower logic 23a, which powers the address and controls to the DRAM array 24a via wires 29 and cables 12a and to the second memory card 21b, and other card slots 15b–15n, through wiring 19a embedded in the memory circuit board 19. The second memory card 21b contains repowering logic 23b which repowers address and control information to the DRAM array 24b. Data to be stored into the DRAM arrays 24a and 24b is first transferred from memory controller 12 across the four data cables 20a and 20b and steering logic 26a and 26b into one half of the store buffers 27a and 27b with half of the total in each buffer. Then the memory controller 12 sends the address and other control information to the DRAM arrays 24a and 24b and steering logic 26a and 26b. The on-card repowering and control circuitry gates the data from the store buffers 27a and 27b to the DRAM arrays 24a and 24b and sequences the DRAMs 24a and 24b such that the data is stored into the DRAM arrays. For a fetch operation the memory controller 12 sends address and other control information to access data from the DRAM arrays 24a and 24b and to latch this data in one half of the fetch buffers 28a and 28b. Then the memory controller 12 initiates the transfer of data from the fetch buffers 28a and 28b back to itself via cables 20a and 20b and the steering logic 26a and 26b.

Figure 3:
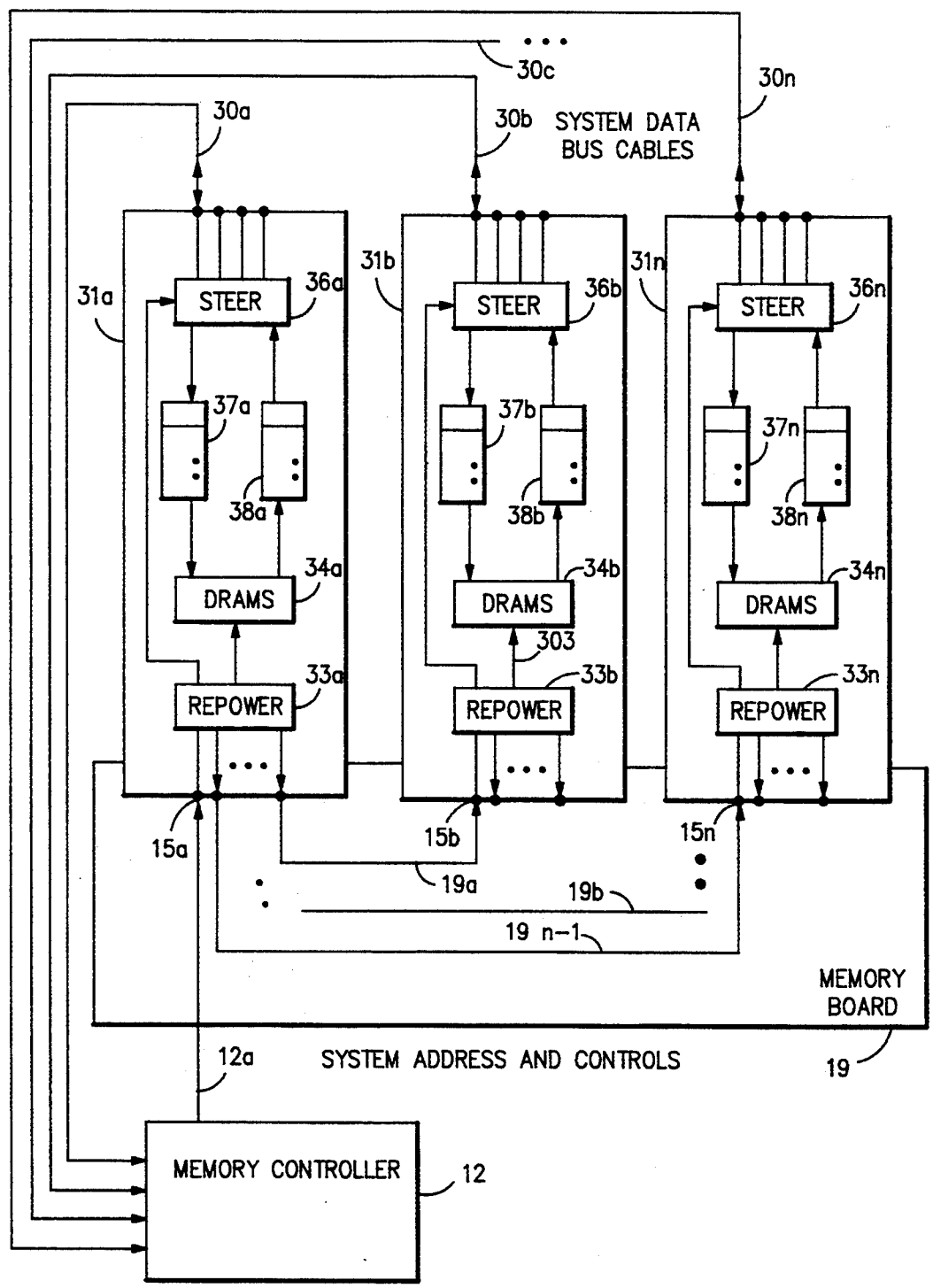
FIG. 3 shows the maximum memory offering of N cards such that each receives/supplies a 1/Nth of the word of data from/to the system.

FIG. 3 illustrates our preferred embodiment in which one data cable 30a is plugged into the top card connector of a first memory array card 31a, another data cable 30b is plugged into the top card connector of a second memory array card 31b, a third cable 30c into a third card (not shown) and the last data cable 30n is plugged into the top card connector of a last memory array card 31n. The data cables (30a–30n) are distributively coupled between the top card connectors of the first, second, third and last memory array cards (31a–31n) and the memory controller 12. In the embodiment shown there are four cables and four cards. One card is not shown. The system address and other controls required to sequence the DRAM operations are driven by the memory controller 12 to the first memory card 31a via cables 12a. This card 31a contains repower circuit 33a, which powers the address and controls to the DRAM array 34a and to all the other memory array cards 31b . . . 31n through wiring 19a–19n−1 embedded in the memory circuit board 19. The second memory card 31b contains repowering circuit 33b which repowers address and control information to the DRAM array 34b via wires 303. The nth memory card contains repowering logic 33n which repowers address and control information to the DRAM array 34n. Data to be stored into the DRAM array 34a–34n is first transferred from memory controller 12 across the N data cables 30a–30n through the steering logic 36a–36n into 1/N of the store buffers 37a–37n. Then the memory controller 12 sends the address and other control information to the DRAM arrays 34a–34n via cables 12a, and wiring 19a, 19b . . . 19n. The on-card repowering and control circuitry 33a–33n gates the data from the store buffers 37a–37n to the DRAM arrays 34a–34n and sequences the DRAMs such that the data is stored into the DRAM arrays 34a–34n. For a fetch operation the memory controller 12 sends address and other control information to access data from the DRAM arrays 34a–34n and to latch this data in 1/nth of each of the fetch buffers 38a–38n. Then the memory controller 12 initiates the transfer of data from the fetch buffers 38a–38n back to itself through the cables and steering logic 36a–36n.

Figure 4:
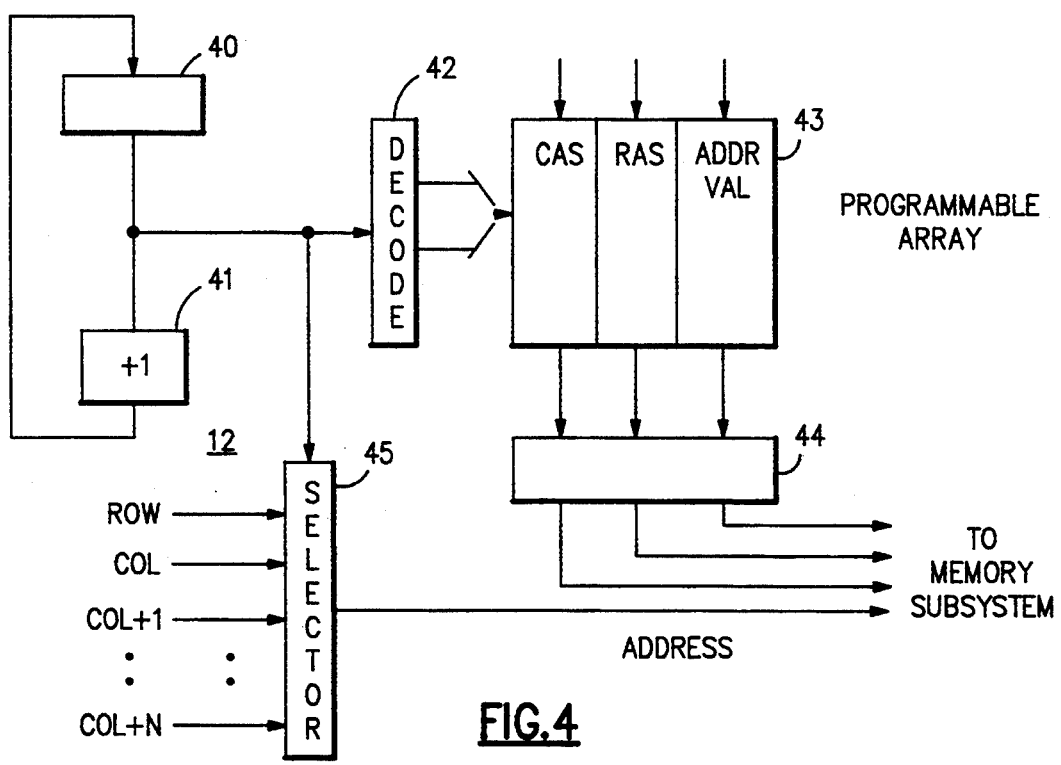
FIG. 4 shows the programmable logic of the memory controller.

FIG. 4 illustrates our preferred embodiment of the memory controller 12. An array timer 40 is incremented for each cycle of array access via the incrementer 41. This timer value is decoded via decoder 42 to select a row of a programmable array 43. This array minimally contains a CAS (Column Address Strobe) column and RAS (Row Address Strobe) column. Additionally it may include an address valid column. The selected row of the array is latched in the memory controls latch 44. This latch then directly drives the memory subsystem. The array timer 40 additionally drives a selector 45 which selects a row address, column address, column address +1 . . . or column address +n to drive to the memory subsystem. The memory control system programmable array 43 is programmed according to the number of cards to produce the timing sequences in FIG. 5.

Figure 5:
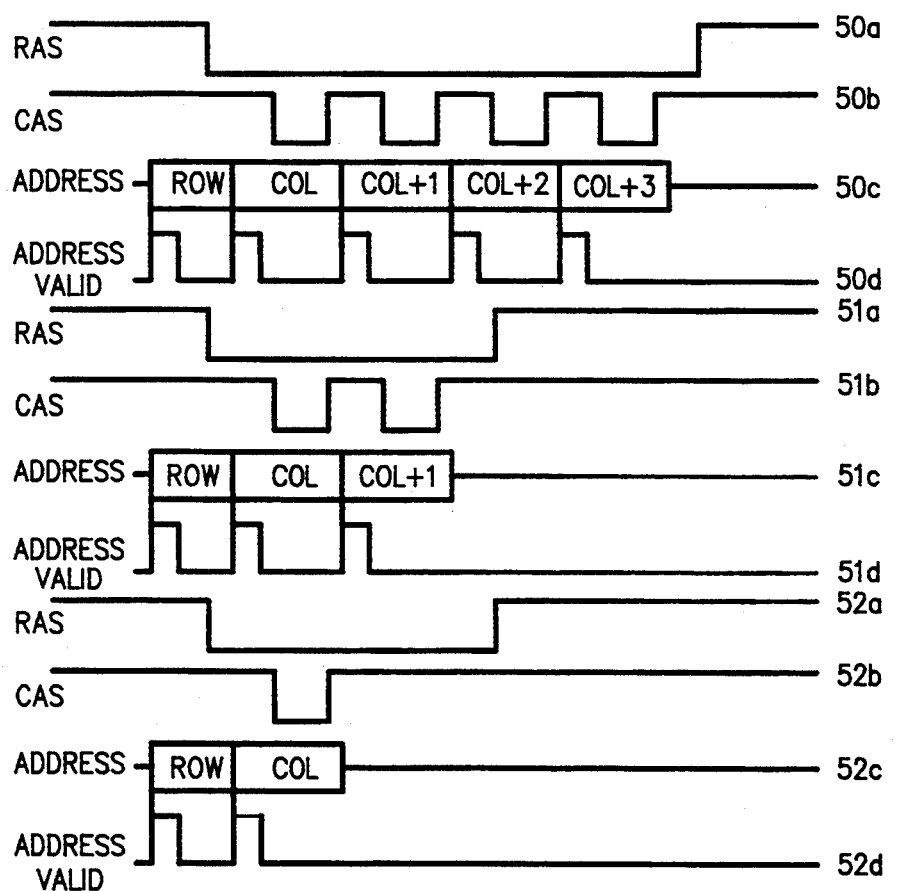
FIG. 5 shows typical timing sequences produced by the memory controller for the minimum memory offering, an intermediate memory offering and a maximum memory offering.

FIG. 5 illustrates the timing sequences produced by our preferred embodiment of the memory controller 12. Pulses 50a, 50b, 50c and 50d are a typical sequence of the RAS, CAS, address and address valid pulses driven to a minimum memory offering of one card (FIG. 1). Pulses 51a, 51b, 51c and 51d are a typical sequence of the RAS, CAS, address and address valid pulses driven to a intermediate memory offering of two cards (FIG. 2). Pulses 52a, 52b, 52c and 52d are typical sequence of the RAS, CAS, address and address valid pulses driven to a maximum memory offering (FIG. 3).

RAS pulses 50a, 51a and 52a are timing pulses which are stored in the RAS column of programmable array 43 and appear at the corresponding RAS output of latch 44. Likewise, CAS pulses 50b, 51b and 52b are timing pulses which are stored in the CAS column of programmable array 43 and appear at the corresponding CAS output of latch 44. Address valid pulses 50d, 51d and 52d are validity pulses which are stored in the ADDR VAL column of programmable array 43 and appear at the corresponding ADDR VAL output of latch 44. The row and column address pulses 50c, 51c and 52c appear on the output bus of selector 45. The outputs of latch 44 and selector 45 are fed to the memory subsystem as shown in FIG. 4. When triggered by the negative going edges of the respective RAS pulses 50a, 51a and 52a, and the CAS pulses 50b, 51b and 52b, the system reads the row address from the ROW packet and the column addresses from the COL, COL+1, COL+2 and COL+3 packets in address pulses 50c, 51c and 52c. Each RAS pulse represents one access cycle while each CAS pulse represents one data cycle. For example, the pulses 50a and 50b show four data cycles in one access cycle, and the pulses 51a and 51b show two data cycles in one access cycle.

CAS pulses 52b represent the timing required for a one-cycle CAS access mode, and CAS pulses 50b and 50c represent the timing required for multiple-cycle CAS access modes. For the FIG. 3 example which illustrates the one-cycle CAS access mode, all system data on all data bus cables 30a–30n are processed simultaneously, i.e., system data is stored in or fetched from the ROW-COL addresses of pulses 52c on all DRAM arrays 34a–34n simultaneously. In this example, only one data cycle is required to complete one access cycle.

CAS pulses 50b represent the timing required for a two-cycle CAS access mode. For the FIG. 2 example which illustrates the two-cycle CAS access mode, half the system data, i.e., the data bits on only one of the data bus cables 20a and one of the data bus cables 20b, are processed during the first data cycle at the DRAM addresses defined by the ROW and COL packets in address pulses 51c. During the second data cycle, the other half of the system data are processed. Specifically, the system data on the other data bus cables 20a and 20b are processed during the second data cycle at the DRAM addresses defined by the ROW and COL+1 packets in address pulses 51c. In this case, two data cycles are required to complete one access cycle.

In the four-cycle CAS access mode represented by the timing of CAS pulses 50b, all of the DRAM arrays on a single card are accessed in four consecutive cycles. During each cycle, one-quarter of the data bits are processed at the respective DRAM addresses defined by the following packets: ROW-COL; ROW-COL+1; ROW-COL+2; ROW-COL+3. In this case, four data cycles are necessary to complete one access cycle.

Referring illustratively to the FIG. 1 embodiment, which operates in a four-cycle CAS access mode, the outputs of memory controller 12, i.e., the outputs of latch 44 and selector 45, are fed to DRAM arrays 14 via cables 12a, sockets 15a, repower logic 13 and wires 13a. The repower logic 13 reads the row address from the corresponding ROW packet of address pulses 50c during the negative going edge of RAS pulses 50a. Likewise, repower logic 13 reads the column addresses from the corresponding COL, COL+1, COL+2 and COL+3 packets of address pulses 50c at the four successive negative going edges of CAS pulses 50b. During the first data cycle, the system data on the lines in one of the data bus cables 10, say the left data bus cable in FIG. 1, is processed (stored or fetched) in all DRAM arrays 14 at the intersection of the same row and column defined by the ROW and COL packets of address pulses 50c. During each of the next three data cycles, the system data on the data lines of a different one of the other three data bus cables 10 is processed (stored or fetched) in all DRAM arrays 14 at the intersections of the row defined by the ROW packet and the respective columns defined by the COL+1, COL+2 and COL+3 packets.

Figure 6:
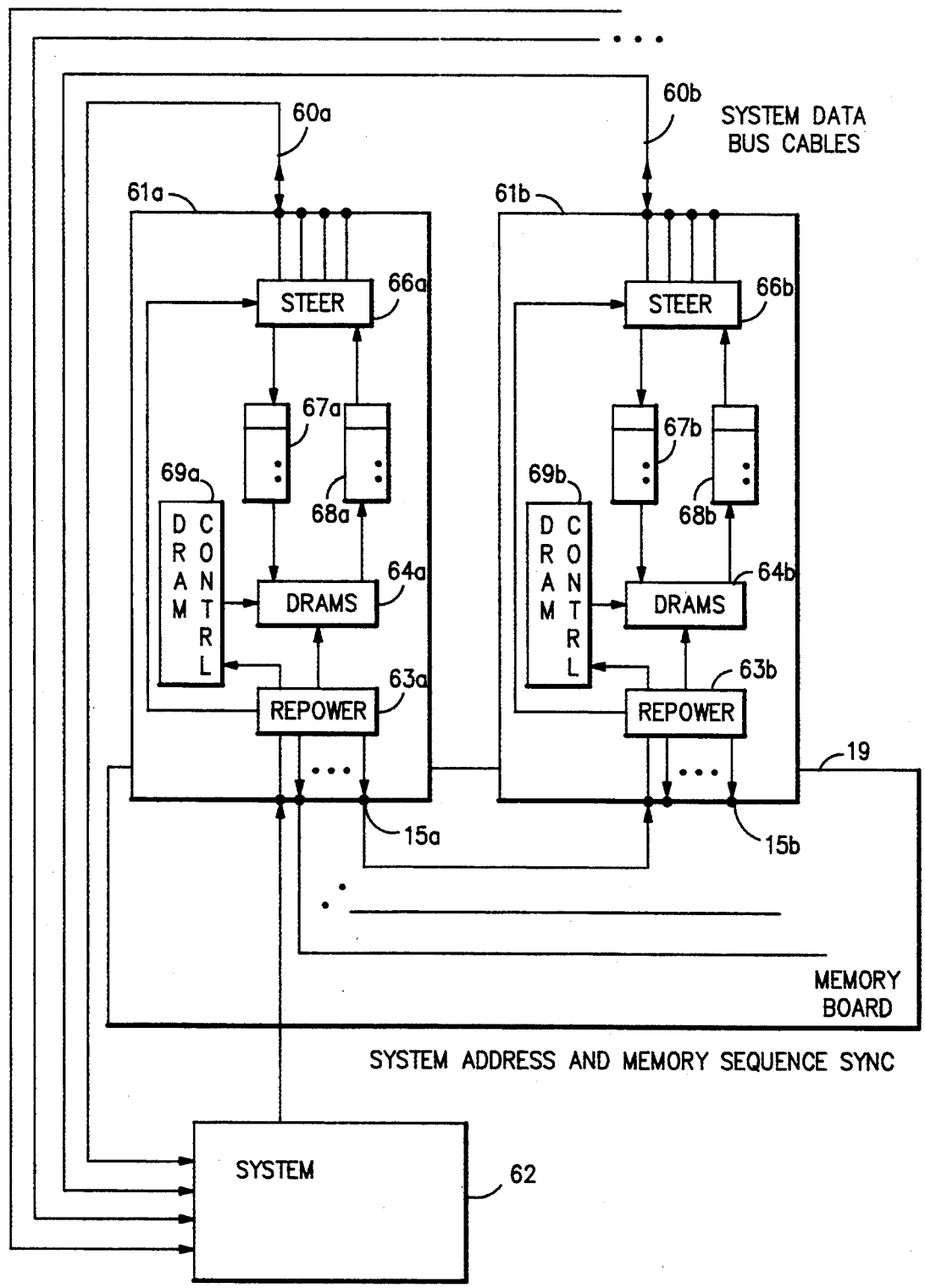
FIG. 6 is another embodiment where the programmable memory controller resides on the cards.

FIG. 6 illustrates an alternate embodiment where the programmable memory controller logic 69a, 69b, . . . , resides not in the system 62 but on each of the memory array cards 61a, 61b, etc. The system 62 sends the address and memory sequence synchronization (sync) pulse to the repower circuit 63a. The sync pulse drives the programmable memory controller logic 69a on the same card and additionally is repowered via repower circuits 63a, 63b, . . . , to all the other programmable memory controller logic entities, 69b, . . . . The system 62 is coupled via cables 60a to 60b the data connectors at the top of the cards 61a, 61b, etc.

Figure 7:
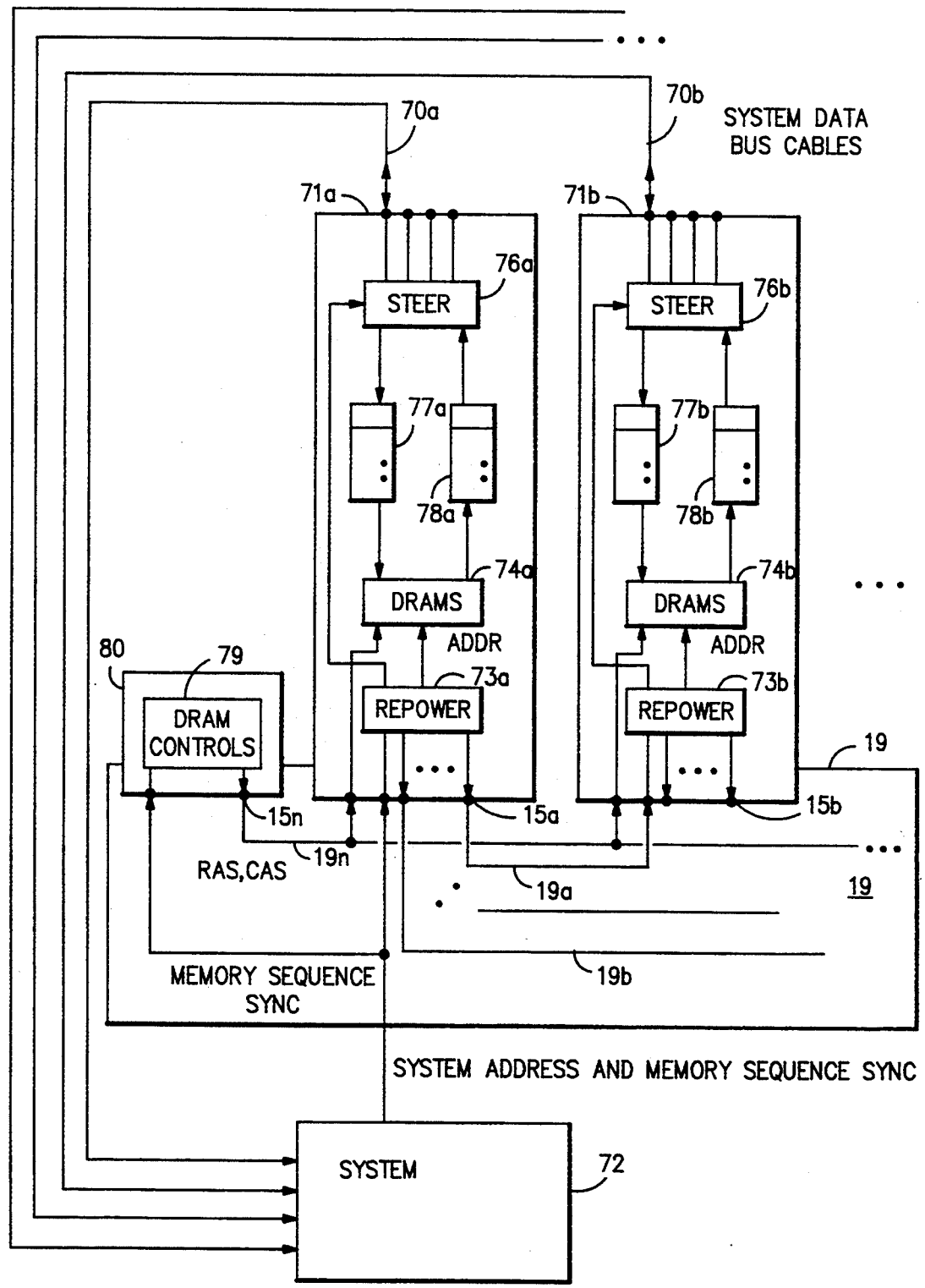
FIG. 7 is another embodiment where the programmable memory controller resides on a separate memory card.

FIG. 7 illustrates an alternative embodiment where the programmable memory controller logic 79 resides on a separate memory control card 80 which does not contain any data buffers or DRAMs. The system 72 sends the address to the array cards (as described in the preferred embodiment) via the repower logic 73a, 73b . . . . and a memory sequence synchronization (sync) pulse to the programmable memory controller logic 79. The programmable memory controller logic 79 sends the RAS, CAS and address valid lines directly to DRAMS 74a, 74b . . . , of each card. The repower circuits then drive the DRAMs. The system 72 is coupled to the data connectors at the top of the cards via the cables 70a, 70b, etc.

While we have described our preferred embodiments of our inventions, it will be understood that those skilled in the art, both now and in the future, may make various improvements and enhancements which fall within the scope of the claims which follow. For example, the system may be expandable to any number of memory cards with more than four data cables.

We claim:

1. An expandable memory system using plural memory array cards comprising:

a circuit board having a plurality of memory card socket sets therealong for said plural memory array cards, said circuit board having wiring between said socket sets for coupling signals between memory array cards plugged into said socket sets, said memory array cards having first card connectors for mating with a socket set of said socket sets and having second card connectors, said memory array cards having memories and support circuitry for accessing said memories, said memory array cards further having repowering means for making multiple copies of system address and control signals which are distributed from memory array card to memory array card connected into said circuit board via said circuit board wiring, memory controller means for accessing said memories, said memory controller means including means for altering the timing sequences to accommodate the number of memory array cards such that said memories are accessed with decreasing numbers of data cycles when increasing numbers of said memory array cards are connected into said circuit board, data means for providing and receiving data, coupling means coupled to said repowering means on at least one of said memory array cards for providing address and control signals to at least one of said cards which are distributed to said repowering means on other cards via said wiring on said circuit board and said socket sets, and data cables having one of their ends distributively coupled to said memory array cards and their other ends coupled to said data means for providing data therebetween.

2. The memory system of claim 1 wherein said memory controller means is provided by a controller on each of said memory array card.

3. The memory system of claim 1 wherein said memory controller means is a single memory controller on a separate card coupled to all of said memory array cards via one of said socket sets and wiring of said circuit board.

4. The memory system of claim 1 wherein said data cables provide store and fetch data and said memory array cards have fetch and store buffers.

5. The memory system of claim 1 wherein said memories store said data at memory locations each having a row address and a column address and wherein said memory controller means is programmable and increments and drives the column address to said circuit board for distribution to all said memory array cards.

6. An expandable memory system comprising:

a circuit board having a plurality of socket sets for plural memory array cards, said circuit board having wiring between said socket sets interconnecting said socket sets;

said memory array cards including DRAMS (dynamic random access memory) memory support means for accessing said DRAMS, repower means for addressing said DRAMS, and first and second card connectors;

a programmable memory controller providing and-/or receiving data;

said first card connectors connected into said socket sets in said circuit board when said memory array cards are plugged into said circuit board;

cabling having one set of ends distributively coupled to said memory array cards and a second set of ends coupled to said programmable memory controller for coupling data to and from said memory array cards via said memory support means;

said programmable memory controller providing system addresses and control information to a first of said memory array cards to access said first card in one-cycle CAS (column address strobe) mode or multiple-cycle CAS mode;

said programmable memory controller having means for changing the memory access timing cycles such that said DRAMS are accessed with decreasing numbers of data cycles when increasing the number of memory array cards connected; and said repower means duplicating said addresses and control addresses and control information and providing said information along said wiring of said circuit board to other memory array cards.

7. A method of expanding a memory system using memory array cards and a circuit board having socket sets therealong with wiring in the circuit board between the sockets for transmitting control and address signals between said sockets, wherein said memory system has a programmable memory controller for providing memory address and control signals and there is data cabling between said programmable memory controller and said memory array cards for providing data comprising the steps of:

adding memory array cards by inserting additional cards in open socket sets, connecting the data cabling from said programmable memory controller the memory array cards and distributing the data cabling connections between said memory array cards, applying said address and control signals to one of said memory array cards which duplicates and forwards the address and control signals to other of said memory array cards via said wiring in said circuit board, and altering by programming said programmable memory controller timing to adjust for the added memory array cards.

* * * * *